July 7, 1931.  Y. A. AHNGER  1,813,130
CONVEYER SYSTEM
Filed Sept. 12, 1928  2 Sheets-Sheet 2
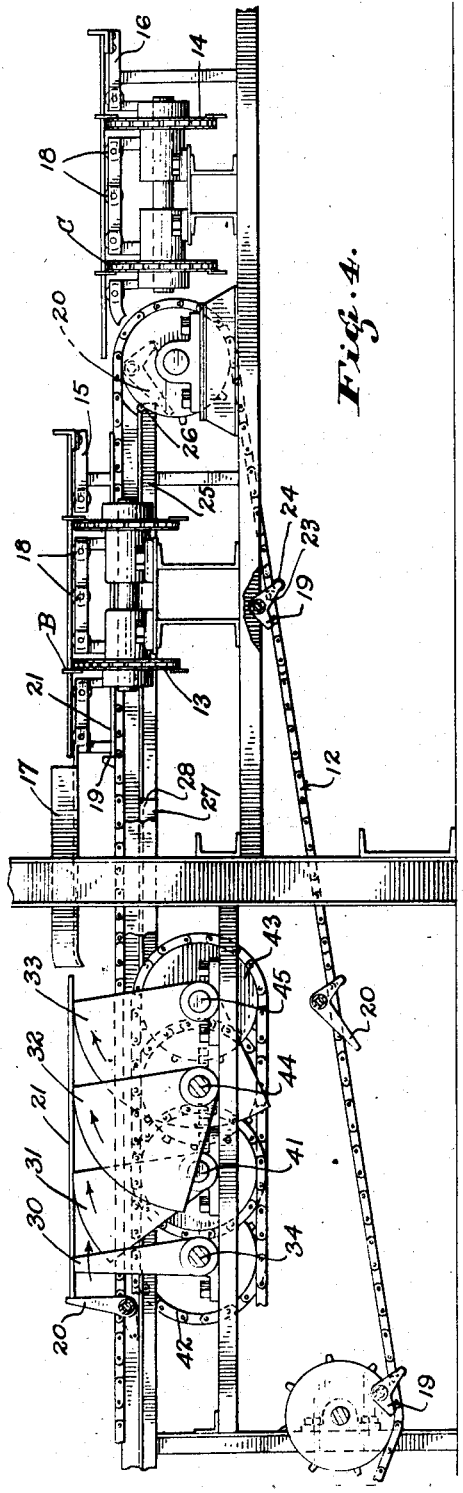
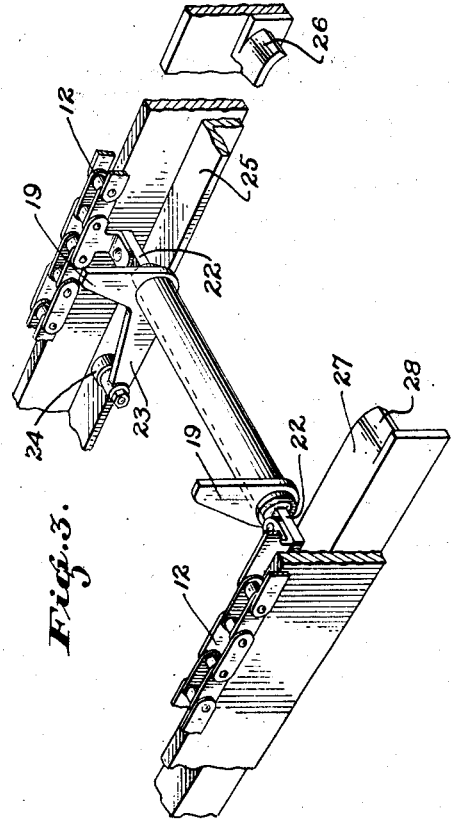
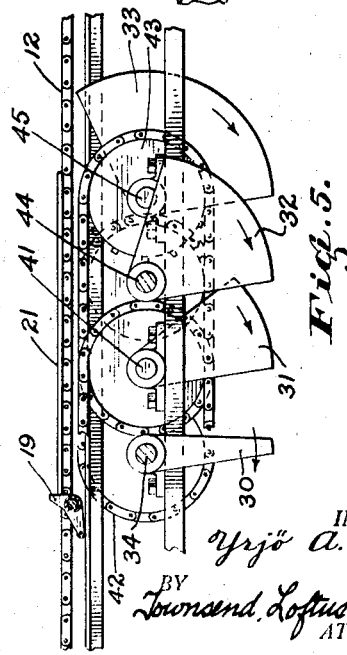
INVENTOR.
Yrjö A. Ahnger.
BY Townsend, Loftus & Abbett
ATTORNEYS.

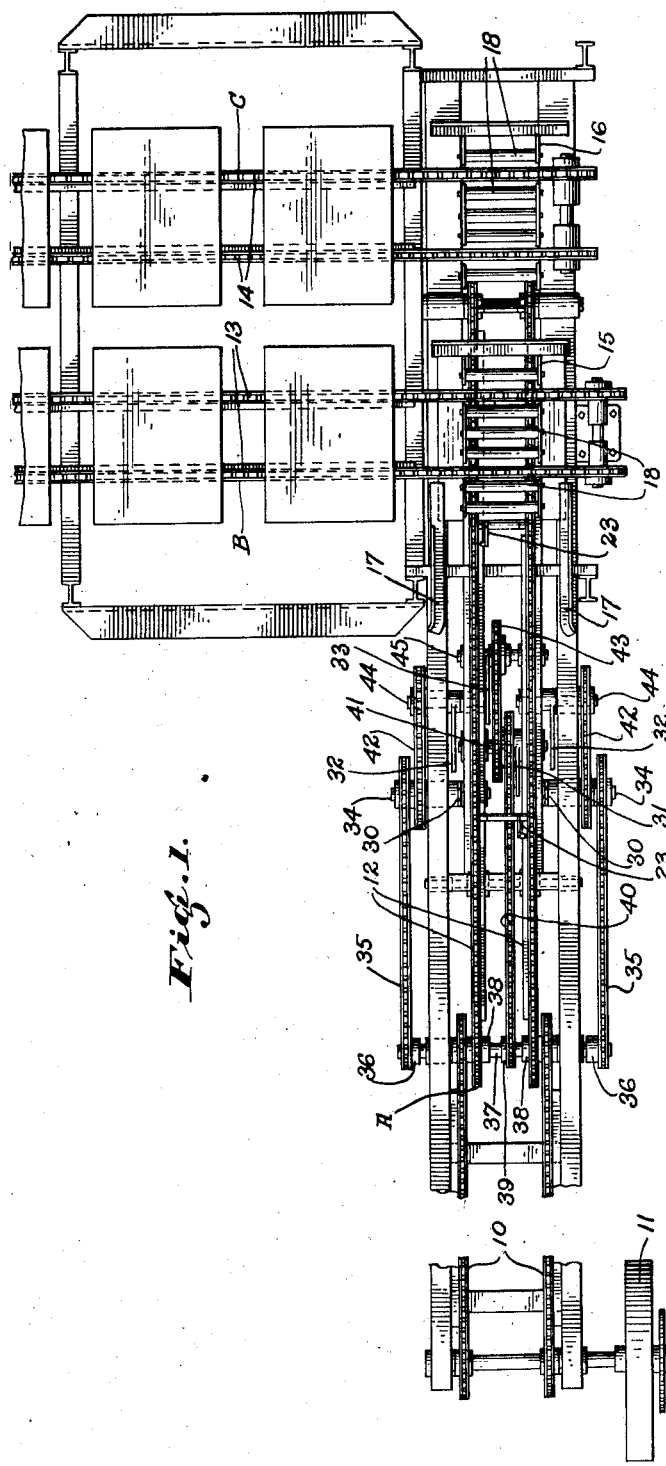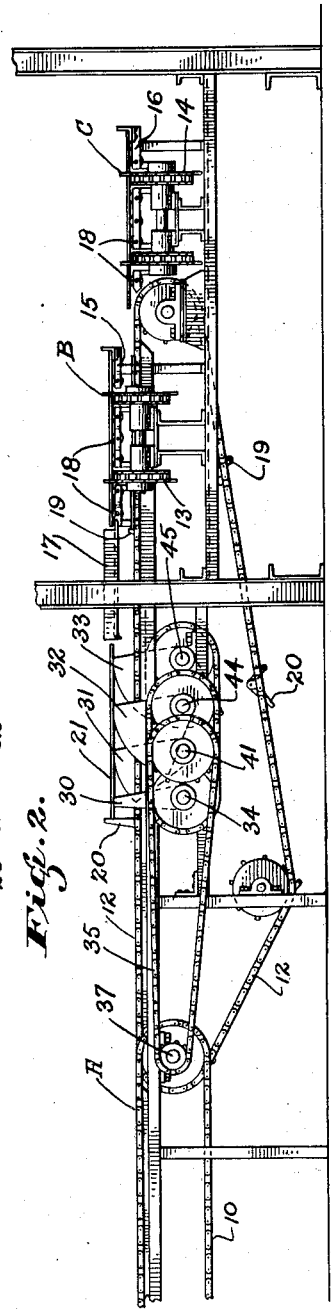

Patented July 7, 1931

1,813,130

UNITED STATES PATENT OFFICE

YRJÖ A. AHNGER, OF CROCKETT, CALIFORNIA

CONVEYER SYSTEM

Application filed September 12, 1928. Serial No. 305,353.

My present invention relates to a conveyer system and more particularly to such a system wherein a single conveyer is adapted to discharge its contents upon a plurality of other conveyers.

An object of my invention is to provide a conveyer system wherein the articles being conveyed may be transferred from a continuously moving conveyer to a plurality of other and intermittently moving conveyers.

A further object of my invention is to provide a new and novel arrangement of conveyers extending at right angles to each other, whereby articles being conveyed by one conveyer may be transferred from one to the other without interfering with the operation of either conveyer.

Another object of my invention is to provide means in combination with a conveyer which will elevate the articles being conveyed and permit their discharge from the conveyer at a point intermediate its length.

A further object of my invention is to provide means in combination with a conveyer system for retaining the articles being conveyed in spaced relation which may be rendered inoperative at predetermined points along the conveyer system.

Other objects and novel features of my invention will be pointed out hereinafter as the description, taken in connection with the accompanying drawings, proceeds.

For the purpose of simplifying an explanation of my invention, I have shown in the accompanying drawings by way of illustration, the application of an embodiment of my invention to the conveying of trays such as are used in the manufacture of cube sugar and the like.

In these drawings—

Figure 1 is a fragmentary plan view of a conveyer system embodying my invention, Figure 2 is a side elevation of the conveyer system shown in Figure 1, Figure 3 is a fragmentary perspective view showing a further detail of my invention, Figure 4 is a partial view in elevation similar to Figure 2, and Figure 5 is a fragmentary view of the elevating portion of my conveyer system.

By referring to Figures 1 and 2 of the drawings, it will be seen that I have, for the purpose of illustrating my invention, shown three distinct conveyers. These conveyers I have designated by the letters A, B, and C. The conveyer A is preferably of the continuously moving type and is provided with suitable followers which retain the articles carried thereby toward the conveyers B and C in spaced relation. The conveyers B and C in the present embodiment of my invention are preferably of the intermittently moving type, that is, the conveyers are adapted to move a predetermined distance and then remain stationary for a predetermined time. The movement of these latter conveyers is so timed that their stationary interval will be sufficiently long to permit an article to be placed thereupon from the conveyer A, as will hereinafter appear.

In connection with the drawings, it is to be understood that the three conveyer systems are driven from a single source of power. This is preferable as the problem of synchronizing the movements of the intermittent conveyers with the spacing of the material carried upon the continuously moving conveyer is greatly simplified. A particular application of my invention where a drive of this character is relied upon is illustrated in United States Patent Number 1,675,260 to L. L. Edmunds, entitled "Continuous cube drying machine." In this patent the intermittent drive of the conveyers B and C is described as being accomplished by the interposition of mutilated or Geneva gears between the main drive and the intermittently moving conveyers. It should be understood, however, that separate drives may be provided for each of the conveyers if such a drive should be found desirable, the only consideration being, as suggested above, that the movement of the intermittent conveyers B and C be regulated so that they will be stationary when the articles being conveyed are transferred thereto from the continuously moving conveyer A. The conveyer A is illustrated as of the chain type, wherein parallel continuously moving chains 10 support the articles being conveyed.

In Figure 1 a pulley 11 is illustrated as the driving means for the chains 10. This pulley is connected to the main drive by means of a suitable belt, not shown. A continuation of the chains 10 is provided by a second set of parallel chains 12 which will be described in more detail hereinafter. The chains 12 are adapted to move in the same direction as the chains 10 and carry the material to either of the conveyers B and C. The conveyers B and C are of the chain type similar to the conveyer A and have, respectively, sets of parallel moving chains 13 and 14. These latter conveyers are illustrated as moving at right angles to the conveyer A, the conveyer C being located with its conveying surface substantially on a level with the conveyer A and the conveyer B being located with its conveying surface elevated above and moving across the path of the conveyer A. At the points where the conveyers B and C intersect the line of travel of the conveyer A, there are provided respectively stations 15 and 16 which are adapted to receive the material being conveyed by the conveyer A and permit its transfer to the conveyers B and C when movement is imparted to the latter, as will hereinafter appear. The station 15 cooperating with the conveyer B is elevated sufficiently high to permit some of the articles being conveyed upon the conveyer A to pass thereunder to the conveyer C and adjacent the station 15 I have arranged suitable guides 17 which function to guide the remainder of the material onto this station.

By referring to Figures 2 and 4, it will be seen that the stations or receptacles 15 and 16 are provided with anti-friction rollers 18 which will facilitate a movement of the articles thereunto under the influence of suitable followers carried by the chains 12. In the present instance these followers are mounted upon the chains 12 in spaced relation and are of two different types alternately arranged therealong. These followers I have designated by the numerals 19 and 20. The followers 19 will be hereinafter referred to as short followers as they are adapted to project only a short distance above the surface of the chains 12 in order to permit their passing under the receptacle 15 and the followers 20 will be hereinafter designated as long followers as they project a greater distance above the surface of the chain 12 so that they will operate to move the articles being transferred to the conveyer B into their final position upon the receptacle 15. In these figures of the drawings, I have illustrated one of the followers 20 as engaging a flat tray 21 which has been raised to a position adjacent the level of the receptacle 15 by an elevating mechanism which forms a part of my invention and which will be described in greater detail hereinafter. From an inspection of the drawings, it will be seen that as the chains 12 move to the right, the followers 20 will effectively slide the tray 21 over the guides 17, the rollers 18, and into its final position upon the receptacle 15. The followers 19 and 20 are pivotally attached to the chains 12 and have offset arms which cooperate with a suitable rail so that they will move into and trip out of operative engagement with the material being conveyed at points adjacent the respective stations and thus permit the chains 12 to move in a continuous manner leaving the discharged material upon the particular station to which it has been transferred, the followers 19 and 20 then becoming inactive, as suggested above.

A better understanding of the operation of these followers will be had by referring to Figure 3 of the drawings, wherein I have illustrated in detail the construction and mode of attaching one of the short followers 19 to the chains 12. From this figure of the drawings, it will be seen that the followers 19 are arranged in pairs positioned transversely of the chains 12 upon a suitable support 22 about which they are adapted to rotate. The two followers 19 are rigidly secured together and a single arm 23 projects rearwardly with respect to their direction of movement and engages through a suitable roller 24 a trackway or rail 25. This trackway is arranged throughout substantially the whole length of the conveyer so that the followers 19 will be operative through the travel of the material in this zone of the conveyer A. At a point adjacent the discharge end of the conveyer A, the trackway or rail 25 terminates, as at 26, and as a result, the roller 24 will pass thereoff and permit the arm 23 to rotate downwardly and render the followers 19 inoperative. The trackway 25, as here illustrated, terminates at a point where the followers 19 have placed a tray or other article into its final position upon the receptacle 16 from which the tray or other article will be carried by the conveyer C. It is to be understood that the followers 20 are of substantially the same design and are mounted in exactly the same way upon the chains 12 with the exception that the followers 20 project vertically a greater distance than those illustrated in Figure 3 of the drawings and that their arms 23 are arranged on the opposite side to that shown in connection with the followers 19 so that their particular guide arm which is similar to the arm 23 on the followers 19 will engage through a similar roller a second trackway or rail 27. This rail 27 is arranged in a manner similar to the rail 25 and terminates, as at 28, at a point adjacent where the followers 20 have moved their particular tray or other article into its final position upon the receptacle 15 from which it will be later removed by the conveyer B.

In addition to the above described mechanism, my invention also contemplates, as previously suggested, an elevating mechanism which is adapted to cooperate with the conveyer A and in the present instance elevate every alternate or second article passing thereover so as to raise the elevated article to the level of the receptacle 15 where it will engage the guides 17 and be carried upon the conveyer B by the engaging followers 20 as the chains 12 continue to move.

The particular elevating mechanism illustrated in the drawings contemplates a plurality of sectors or segments of disks 30, 31, 32 and 33. These disks are mounted upon suitable stub shafts which continuously rotate when the conveyer 12 is in operation. There are two each of the sectors 30 and 32, and one each of the sectors 31 and 33. These sectors are arranged both longitudinally and transversely with respect to the conveyer chains 12 so that when they engage the bottom of an article being conveyed, it will be elevated and retained in stable equilibrium and at the same time moved along at substantially the same speed and in a direction corresponding to that of the conveyer chains 12, as will hereinafter appear.

By referring to Figure 1, it will be seen that the sectors 30 are mounted upon stub shafts 34 which are driven by suitable chains 35 extending along the outside of the supporting frame of the conveyer A. The chains 35 are driven from sprockets 36, which, in the present instance, are mounted upon the ends of a shaft 37. The shaft 37 also carries double sprockets 38 over which the conveyer chains 10 and 12 pass. The double sprockets 38 in this instance form a driving connection between the two portions of the conveyer system.

Mounted between the double sprockets 38 and upon the shaft 37 there is a third sprocket 39 which is in every respect similar to the sprockets 36, and passing over this latter sprocket there is provided a chain 40 which serves to drive the stub shaft 41, upon which the elevating sector or disk 31 is mounted. The drive provided by the chains 35 and 40 to the shafts 34 and 41 is continued on through additional chains 42 and 43 to additional stub shafts 44 and 45 upon which the sectors 32 and 33 are mounted. The sprockets 36 and 39 are of substantially one-half the diameter of the double sprockets 38 so that, as a result, the chains 35 and 40 will move at approximately one-half the speed of the chains 10 and 12 and by this arrangement a timing of the elevating disks 30, 31, 32 and 33 is effected so that they will rotate above the surface of the chains 12 of the conveyer A at spaced intervals so that in the present instance every second article being conveyed by the conveyer A will be elevated therefrom.

Another novel aspect of this particular elevating mechanism is that by providing sectors having a subtending arc at a radius of substantially twice the distance between their axes of rotation and the surface of the conveyer A, a lateral movement will be imparted to the article elevated which will correspond to the movement of the conveyer chains 12, and, as a result, no excessive strains will be placed upon the followers 20 during the period when the articles are being elevated.

By referring to Figures 4 and 5 of the drawings, it will be seen that the disks 30, 31, 32 and 33 are mounted upon their respective stub shafts so that their leading edges will always project substantially parallel with each other, and that by reason of this arrangement the segments will engage the bottom of the article to be elevated at substantially the same time. Due to the further fact that the peripheral arcs or supporting surfaces of the segment are of different lengths, as illustrated, depending upon their relative positions with respect to the articles being conveyed, it will be seen that they will only contact with the bottom of the article during the time when the article is immediately thereabove. This means that while the segments will engage the article at substantially the same time in elevating it, they will disengage it independently at different times so that as soon as the elevated article has passed over a particular segment, they will, by reason of their continuous movement, rotate below the surface of the conveyer A where they will not interfere with the free passage thereover of the next following article carried by the conveyer A. This is particularly well illustrated in Figure 5 of the drawings, wherein it will be seen that while the trailing end of the segment 33 has moved only a slight distance below the surface of the chains 12, the following tray 21 has moved substantially over the remaining segments and, as a result, it will be possible for this tray to move over the elevating segments and permit the next following tray 21 to assume a position substantially where the tray 21 is shown in this view, so that it will be engaged simultaneously by all of the segments and elevated to the position where the tray 21 is shown in Figure 4.

In describing the operation of my improved conveyer, I shall assume that it is operating to feed trays of sugar to the cube drying apparatus disclosed in the above referred to patent and that the trays 21 illustrated in the drawings each carry a layer of cubes of sugar. The trays 21 with their charge of cube sugar are placed upon the conveyers 10 periodically in spaced relation as they are discharged from the cube forming machine and as the chains 10 move to the right, as viewed in the figures of the drawings, they will pass over onto the chains 12 where they will be engaged at their rear edge by the followers 19 and 20. It will be first assumed that a tray 21 has been engaged by one of the short followers 19, and in following the travel of this tray it will be seen that it will travel along the conveyer chains 12 and pass over the elevating segments 30, 31, 32, and 33, as illustrated in Figure 5. As the chains 12 continue to move, the tray will then pass under the receptacle 15, as illustrated in Figure 4, and will finally engage the rollers 18 arranged upon the receptacle 16. The followers 19 at this point will remain active and as a result the tray will be moved over these rollers 18 into its final position upon the receptacle 16. As soon as the tray 21 has reached its final position in this receptacle, the roller 24 carried by the arm 23 of the followers 19 will disengage the rail 25 at the point 26 and thus render the followers 19 inoperative so that they, together with the chains 12, will then continue on and leave the tray 21 upon the receptacle 16, where it will be in a position to be picked up by the conveyer C when the latter conveyer moves as previously suggested. It is assumed that at the time the tray 21 is moved upon the station 16 the conveyer C is stationary.

During the above cycle of events, the tray following the one just considered will have been engaged by a pair of the long followers 20 and as this following tray reaches a position over the segments 30, 31, 32, and 33, they will, because of their timing or synchronization with the travel of the long followers, engage the bottom of this following tray and elevate it to the position illustrated in Figure 4. As the conveyer chains 12 continue to move, the followers 20 and the segments 30, 31, 32, and 33 will carry this following tray along and into engagement with the guides 17. The segments 30, 31, 32, and 33 will, by reason of their spacing and arrangement, maintain the tray in equilibrium and effect a successful transfer of this tray to the guides 17. As these segments continue to rotate they will disengage the tray as it passes thereover and the followers 20 will then continue to slide the tray over the rollers 18 arranged upon the receptacle 15 until this tray has reached its final position over the conveyer B. As soon as the tray reaches this position the followers 20 will then be rendered inoperative in a manner similar to that described in connection with the followers 19, the followers 20 being rendered inoperative at this point by reason of the termination of the rail 27 at the point 28, as previously suggested.

By an inspection of Figure 4 of the drawings, it will be seen that the trays are arranged in spaced relation upon the chains 12 at intervals corresponding substantially to the distance between the two conveyers B and C and, as a result of this arrangement, the two trays above considered will each reach their respective stations 16 and 15 at substantially the same time so that while the conveyer A moves continuously, the conveyers B and C may be moved intermittently together and in synchronism.

From the above, it will be seen that I have provided a novel arrangement of conveyers whereby material may be transferred from one to a plurality of other conveyers in a continuous manner and while the conveyers B and C are shown as operating to convey the material in the same direction away from the conveyer A, it will be readily understood that these conveyers B and C might well operate to convey material away from the conveyer A in opposite directions, the only consideration in connection with intermittently moving conveyers being that these two conveyers be stationary or move at the same time. At this point and in order that there be no misunderstanding, I desire to have it understood that while I have described the conveyers B and C as being intermittently driven, I contemplate that certain aspects of my present invention are also applicable to conveyer systems wherein all of the conveyers move in a continuous manner. It will be seen that my invention might also be practiced with two conveyers such as the conveyers A and B, so that material might be transferred from a continuously moving conveyer at a point intermediate its ends to a second intermittently or continuously moving conveyer. Such an arrangement may be found to be very desirable in some instances and I therefore desire to have it understood that the above description and drawings are to be taken as illustrating rather than limiting my invention and that I desire to cover in the following claims all embodiments of my invention which fall within the spirit and scope of the following claims.

Having thus described my invention, what I claim and desire to secure by Letters Patent is—

1. A conveyer system, comprising a pair of intermittently moving conveyers arranged side by side at different levels, an additional conveyer extending horizontally and at right angles to said pair of conveyers, said latter conveyer having followers for spacing the articles carried thereupon, an automatic elevating mechanism operating in timed relation with the followers upon said latter conveyer for elevating alternate articles carried thereby, and a guide for directing the elevated articles on to the upper one of said pair of conveyers, whereby the articles conveyed will be transferred uniformly to said pair of conveyers.

2. In a conveyer system, the combination of a horizontally disposed conveyer having followers for spacing articles thereupon, a second conveyer intermediate the ends of said first conveyer disposed above and crossing said first conveyer, a stationary support for receiving articles carried by said first conveyer arranged at the level of said second conveyer, a plurality of cam-like elevating members for transferring articles from said first conveyer to said stationary support, and followers upon said second conveyer operating in timed relation with said elevating means for transferring the articles deposited upon said support by said elevating means to said second conveyer.

3. A conveyer system, comprising a continuously moving horizontally disposed conveyer, a second conveyer disposed above said first conveyer and crossing it at substantially a right angle, a stationary support located at the point where said second conveyer crosses, means upon said first conveyer for spacing the articles carried thereupon, a plurality of rotating cam sectors adapted to periodically project through the plane of the first conveyer and elevate articles carried thereby, whereby articles carried by the first conveyer will be elevated and transferred to said stationary support, and means carried by said second conveyer removing the articles from said support to said second conveyer.

4. In a conveyer system, the combination of a continuously moving horizontally disposed conveyer, a second horizontally disposed conveyer located intermediate the ends and above said first conveyer, followers spaced upon said first conveyer for spacing the articles carried thereby, and an elevating mechanism operating in timed relation with the followers upon said first conveyer for transferring alternate articles carried thereby to said second conveyor substantially as described.

5. In a conveyer system, the combination of a horizontally disposed conveyer for conveying articles, an elevated article receiving station arranged above said conveyer intermediate its ends, and a plurality of longitudinally and transversely disposed rotating cam sectors adapted to move upwardly and through the plane of said conveyer to engage articles carried thereby, said cam sectors having a peripheral velocity corresponding to that of the conveyer, whereby the articles engaged thereby will be raised and carried along with the conveyer and deposited upon said receiving station as the cams continue to rotate.

6. A conveyer system, comprising a continuously moving horizontally disposed conveyer, a second intermittently moving conveyer disposed at the end of said first conveyer and having a direction of movement at substantially a right angle thereto, means upon said first conveyer for spacing the articles carried thereupon operating in timed relation with the movements of said second conveyer, whereby articles carried by the first conveyer will be transferred to said second conveyer during one of its stationary periods, and means for rendering said spacing means inoperative when the articles are thus deposited upon the second conveyer.

7. In a conveyer system, the combination of a continuously moving horizontally disposed conveyer, a second conveyer at the end of said first conveyer disposed on substantially the same horizontal plane, a third horizontally disposed conveyer located intermediate the ends and above said first conveyer, followers spaced upon said first conveyer for spacing the articles carried thereby, and an elevating mechanism operating in timed relation with the alternate followers upon said first conveyer for transferring alternate articles carried thereby to said last conveyer substantially as described.

8. In a conveyer system, the combination of a horizontally disposed conveyer for conveying articles, an elevated article receiving station arranged above said conveyer intermediate its ends, and a plurality of cam sectors adapted to move upwardly and through the plane of said conveyer to engage articles carried thereby, said cam sectors having a peripheral velocity corresponding to that of the conveyer, whereby the articles engaged thereby will be raised and carried along with the conveyer and deposited upon said receiving station as the cams continue to rotate.

9. In a conveyer system, the combination of a continuously moving conveyer, long and short followers arranged alternately in spaced relation along said conveyer adapted to engage the articles being carried and hold them in spaced relation upon said conveyer, and means cooperating with said followers whereby said long followers will be rendered inoperative at one station along said conveyer and said short followers rendered inoperative at another station along said conveyer.

10. In a conveyer system, the combination of a continuously moving conveyer, long and short followers arranged alternately in spaced relation along said conveyer adapted to engage the articles being carried and hold them in spaced relation upon said conveyer, and trackways of different lengths cooperating with said followers whereby said long followers will be rendered inoperative at one station along said conveyer and said short followers rendered inoperative at another station along said conveyer.

11. In a conveyer system, the combination of a continuously moving conveyer, long and short followers arranged alternately in spaced relation along said conveyer adapted to engage the articles being carried and hold them in spaced relation upon said conveyer, means cooperating with said followers whereby said long followers will be rendered inoperative at one station along said conveyer and said short followers rendered inoperative at another station along said conveyer, and means cooperating with said conveyer and said long followers whereby each alternate article being carried by said conveyer will be elevated therefrom and discharged at a point along said conveyer.

12. In a conveyer system, the combination of a continuously moving conveyer, long and short followers arranged alternately in spaced relation along said conveyer adapted to engage the articles being carried and hold them in spaced relation upon said conveyer, trackways cooperating with said followers whereby said long followers will be rendered inoperative at one station along said conveyer and said short followers rendered inoperative at another station along said conveyer, and a plurality of cams cooperating with and projecting through said conveyer and adjacent said long followers whereby each alternate article being carried by said conveyer will be elevated therefrom and discharged at a point intermediate the ends of said conveyer.

13. A conveyer system comprising a continuously moving horizontally disposed conveyer, a second conveyer disposed at the end of said first conveyer and at substantially the same level having a direction of movement at substantially a right angle thereto, a stationary support for receiving articles carried by said first conveyer, followers upon the first conveyer for spacing articles carried thereupon, and followers on the second conveyer operating in timed relation with the followers on the first conveyer for transferring the articles deposited upon said support to said second conveyer.

YRJÖ A. AHNGER.